United States Patent [19]

Scodino et al.

[11] 3,897,099

[45] July 29, 1975

[54] TONG APPARATUS OPERATED OLEOPNEUMATICALLY FOR LIFTING A SUBMERGED PIPELINE

[75] Inventors: Ambrogio Scodino, San Donato Milanese; Adalberto Raimondi, Nerviano, both of Italy

[73] Assignee: Saipem S.p.A., Milan, Italy

[22] Filed: Dec. 19, 1973

[21] Appl. No.: 426,129

[30] Foreign Application Priority Data
Dec. 20, 1972 Italy .................................. 33279/72

[52] U.S. Cl. .................. 294/88; 294/66 R; 294/106
[51] Int. Cl.² .......................................... B66C 1/30
[58] Field of Search ........ 294/66 R, 70, 86 R, 81 R, 294/88, 106, 118, 119; 214/147 G, 653; 91/167 R; 92/152

[56] References Cited
UNITED STATES PATENTS

| | | | |
|---|---|---|---|
| 2,683,546 | 7/1954 | Sherriff | 294/88 X |
| 2,904,202 | 9/1959 | Brady | 294/88 X |
| 3,165,348 | 1/1965 | Keskitalo | 294/88 |
| 3,172,333 | 3/1965 | Mercier | 91/167 |
| 3,363,929 | 1/1968 | Nelson | 294/88 |
| 3,574,387 | 4/1971 | Hahn | 294/88 |
| 3,610,100 | 10/1971 | Hoffman | 91/167 |
| 3,655,232 | 4/1972 | Martelee | 294/88 X |
| 3,774,954 | 11/1973 | Taguchi et al. | 294/88 X |

Primary Examiner—Evon C. Blunk
Assistant Examiner—Johnny D. Cherry
Attorney, Agent, or Firm—Ralph M. Watson, Esq.

[57] ABSTRACT

Tong apparatus operated oleopneumatically for lifting a submerged pipeline either directly by a frogman or by an operator on a pontoon or vessel. The apparatus includes a pair of jaws controlled by a double acting cylinder with two pistons. The cylinder has a body pivotally connected to the upper end of one jaw and has an active chamber wherein a first piston with a wide cross-section slides, while a second piston having a small cross-section is pivotally connected to the upper end of the other jaw and slides coaxially as to the first piston in a second active chamber provided by the wide cross-section of the said first piston.

With the present invention small quantities of oil are used in causing the jaws to approach and to grasp and lift the pipeline. The relatively wide shifting required for approaching the jaws to the pipeline to be grasped and lifted is obtained by acting oleopneumatically into the said second active chamber against the piston having a small cross-section, which involves the use of a small quantity of oil. The pipeline grasping operation, which requires a relatively small shifting and small oil consumption, is then carried out by acting oleopneumatically into the first said active chamber against the said first piston having a wide cross-section.

6 Claims, 2 Drawing Figures

TONG APPARATUS OPERATED OLEOPNEUMATICALLY FOR LIFTING A SUBMERGED PIPELINE

The present invention relates to tong apparatus which facilitates the gripping and lifting of a submerged pipeline either directly by a frogman under water through the simple handling of levers controlling three-way valves or by an operator working on the deck of a pontoon or vessel. According to the prior art the lifting or recovery of a pipeline laid on the sea-bottom is obtained by means of steel slings which are passed below the pipeline to be lifted, arranged in the form of a slip-knot and hooked to lifting devices such as winchs, cranes etc.

Such a system involves several drawbacks. First, there is the necessity of a preventive digging operation allowing the slings to pass below the pipeline. This operation may be full of difficulties depending upon the nature of the seabottom. Furthermore, the handling of steel slings having a large diameter is particularly difficult and dangerous for the frogmen and requires an execution time which has been found prohibitive in deep waters.

The present invention is directed to eliminating the above-said drawbacks, and to providing apparatus which allows easy and quick lifting of the pipelines, even in deep waters. With the present invention the necessity of preventive digging is eliminated and the grasping operation is simplified.

The apparatus according to the invention comprises specifically a structure with a central body having a curvilinear shape adapting itself to the outer diameter of the pipeline to be lifted, and by two pairs of pipeline grasping jaws pivotally connected to the side ends of said central body and operated each by an oleopneumatic cylinder. According to a preferred embodiment, the tongs apparatus of the invention is self-contained, i.e., it is provided with oleopneumatic accumulators supplying the energy necessary to operate the oleopneumatic cylinders controlling the jaws, so that the tong apparatus does not require a connection with the surface of the water by means of pipes or cables. Further the closing of the jaws is obtained through the simple shifting of levers acting on three-way valves for the delivery, the exhaust and the rest. To minimize the oil consumption and to allow a greater number of operations for the closing of the jaws of the submersed tong apparatus without requiring a recharge, the present invention provides as a distinctive feature a pair of jaws controlled by a double-acting cylinder with two pistons, said cylinder having a cylindrical body pivotally connected to the upper end of one jaw and having an active chamber wherein a first piston with a wide cross-section slides, while a second piston having a small cross-section is pivotally connected to the upper end of the other jaw of the pair of jaws and slides coaxially as to the first piston in a second active chamber provided by the wide cross-section of the said first piston. In this way small quantities of oil are used in causing the jaws to approach and to grasp and lift the pipeline. The relatively wide shifting required for approaching the jaws to the pipeline to be grasped and lifted is obtained by acting oleopneumatically into the said second active chamber against the piston having a small cross-section, which involves the use of a small quantity of oil. The pipeline grasping operation, which requires a relatively small shifting and small oil consumption is then carried out by acting oleopneumatically into the first said active chamber against the said first piston having a wide cross-section.

According to another distinctive feature of the invention each pair of jaws of the tong apparatus is continuously subjected to an oleopneumatic reversing thrust acting against the two said pistons into chambers opposed to the two said active chambers of the oleopneumatic cylinder for keeping or bringing the jaws of the tong apparatus in an "all open" position when the closing thrust fails or is stopped. In practice the reversing thrust is kept at a low value because this thrust must be overcome by the closing thrust before the jaws will close.

According to a preferred embodiment the reservoirs for recovering the drained oil consist of watertight compartments inside the free ends of the jaws wherefrom the oil may be drawn and reutilized through suitable drain cocks.

The invention, as it relates to a self-contained tong apparatus, will be now illustrated in the accompanying drawings which are merely exemplary and non-limiting embodiments, in that the adoption of constructional techniques or equivalent members different from those suggested herein lies within the scope of the present invention.

Figure 1:
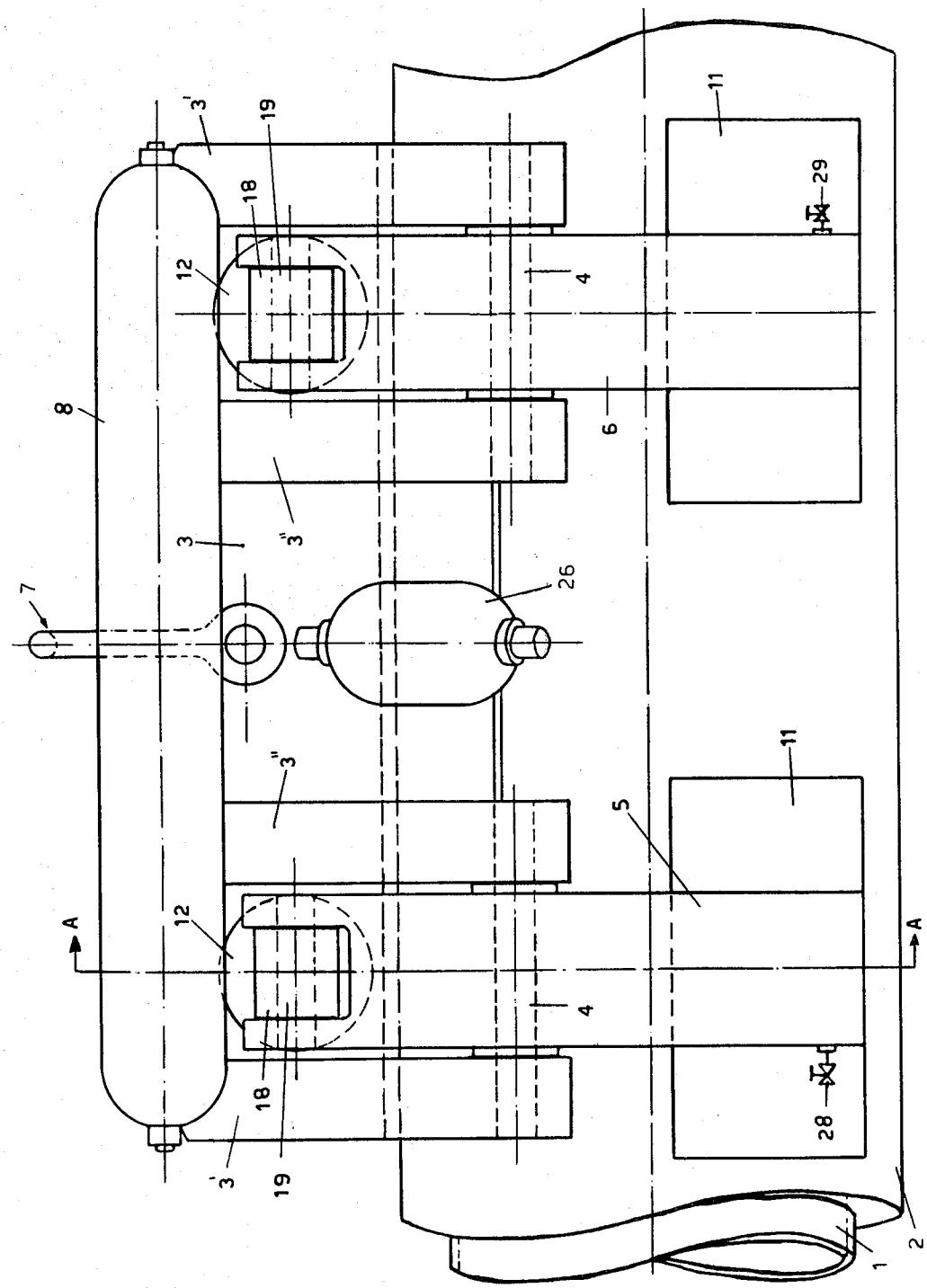
FIG. 1 shows a schematic, longitudinal view of the tong apparatus operated oleopneumatically for lifting a submerged pipeline according to the invention.
Figure 2:
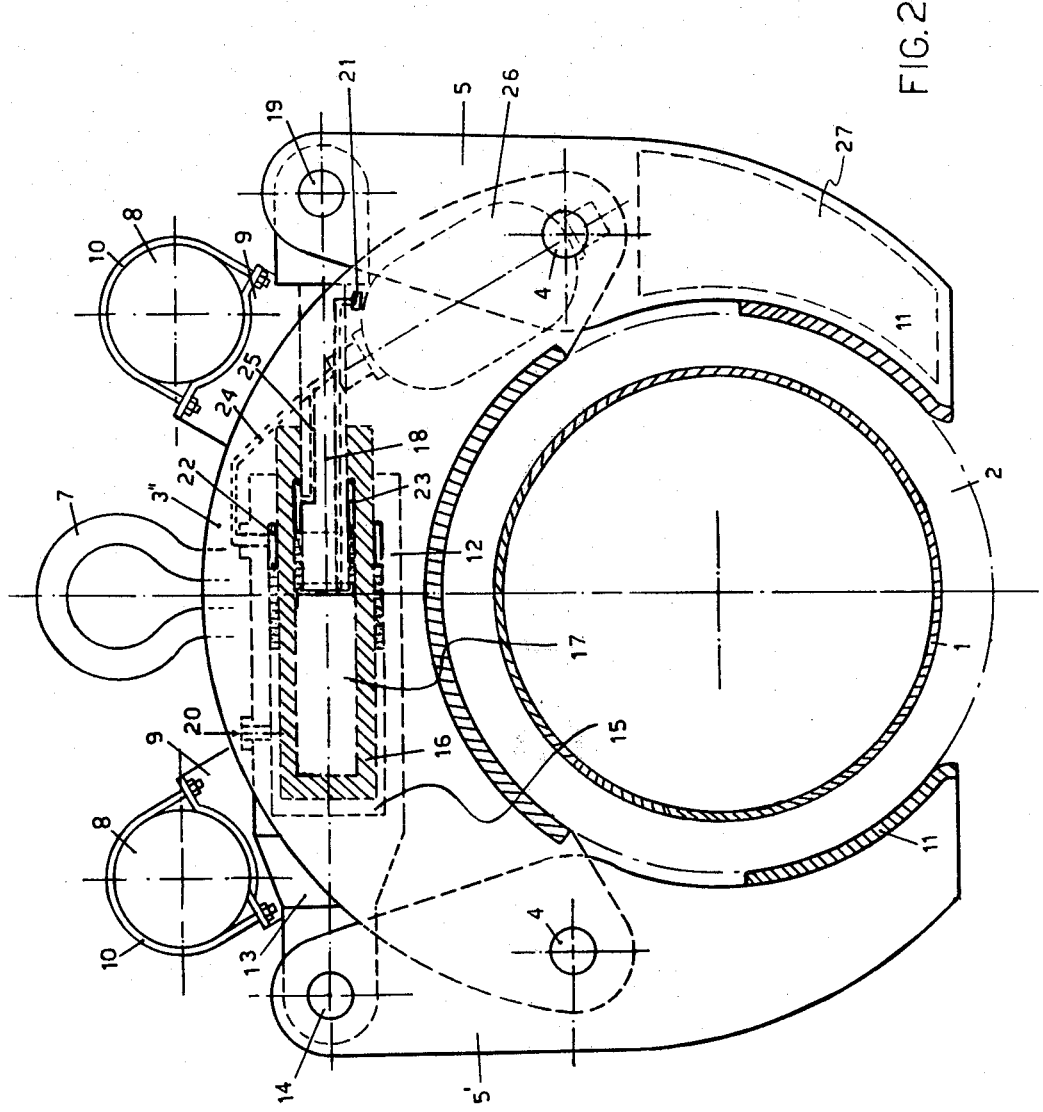
FIG. 2 shows a schematic, front view of the tong apparatus of FIG. 1 as viewed along section line AA.

Referring to the figures, there is illustrated pipeline 1 with a protective cement coating 2, which has to be grasped and lifted by the tong apparatus of the invention. The tong apparatus of the invention comprises a structure having a central body 3 made of iron plates electrically welded. On each side end of body 3 are two supports 3' and 3" respectively, between which are two pairs of jaws 5, 5' and 6, 6' respectively (jaw 6' is not visible in the figures, since it is opposed to jaw 6 of FIG. 1). The jaws 5, 5' and 6, 6' are pivotally supported by pins 4.

The whole structure is shaped according to a curvilinear shape adapting itself to the outer diameter of the pipeline to be hooked and lifted and it supports on its upper part both the eye hook 7 articulated to said central body 3, and the main oleopneumatic accumulators 8 supplying the energy necessary to close the tong apparatus, said accumulators being fixed in their housings 9 by metallic stirrups 10.

Each jaw (5, 5', 6, 6') presents at its lower part a claw 11 having the curvilinear shape of the diameter of the pipeline to be grasped and lifted. The two jaws of each pair of jaws 5, 5' and 6, 6' respectively, are mutually connected at their upper parts by means of an oleopneumatic cylinder 12.

Each of the two cylinders 12 has a body 13 pivotally connected to the upper end of jaw 5' (or 6') by means of a pin 14 and includes an inner active chamber 15 having a wide cross-section wherein a first piston 16 slides. Inside the first piston 16 there is then a second active chamber 17 having a small cross-section, wherein a second piston 18 slides coaxially as to the first piston, said second piston being pivotally connected at its free end to the upper end of the other jaw 5 (or 6) of the pair of jaws by means of a pin 19. The two said active chambers 15 and 17 are connected to said main oleopneumatic accumulators 8 by means of ducts not shown in figures through the three-way valves 20 and 21 operated by levers also not shown. The chambers 22 and 23 of cylinders 12, are opposed to said active chambers 15 and 17 with respect to the relevant pistons 16 and 18, respectively, and are directly connected by means of ducts 24 and 25 to an oleopneumatic accumulator 26 fixed by metallic stirrups on a side of said central body 3. In this way accumulator 26 subjects pistons 16 and 18 of two cylinders 12 to a continuous reversing thrust tending to maintain the jaws of the tong apparatus in an "all open" position, said thrust having to be overcome by the oleopneumatic closing thrust supplied by the main accumulators 8 into the said chambers 15 and 17 to close the jaws.

The drained oil used for operating the pistons of the oleopneumatic cylinders 12 to close the jaws is conveyed into watertight reservoirs 27 inside the jaws 5 and 6 respectively, wherefrom the oil may be drawn and reutilized through the drain cocks 28 and 29.

In operation, the tong apparatus is hooked by means of its eye hook 7 to the chain or rope of a winch or crane and then immersed till it leans with its central body 3 on the submerged pipeline to be grasped and lifted, said placement being accomplished because the tong apparatus is automatically kept in an open position by the reversing thrust exerted by accumulator 26 into chamber 22 and 23 of the oleopneumatic cylinders operating the jaws of the tong apparatus. At this point a frogman shifts the lever controlling the three-way valve 21 to the delivery position, so that the oil of the main accumulators 8 is conveyed into the active chambers 17 having a small cross-section relative to the said oleopneumatic cylinders. Said oil, by exerting a closing thrust which is greater than the above-said reversing thrust, causes the pistons 18 to come out from the said chambers 17 so that the jaws of the tong apparatus close and approach the pipeline to be grasped and lifted. When said operation approaching the jaws to the pipeline is completed, the frogman shifts the above-said lever to the rest position and, by acting on the lever controlling the three-way valve 20, he causes the oil delivery of the main accumulator 8 to flow into the active chambers 15 having a wide cross-section relative to said cylinders 12, so that a strong thrust is exerted on the pistons and the jaws firmly grasp the pipeline which now can be lifted by the winch or crane. For releasing the tong apparatus from the pipeline, the frogman shifts the above-said levers controlling the three-way valves 21 and 20 to their exhaust position so that the tong apparatus reopens gradually as the said reversing thrust overcomes the closing thrust.

It is evident that what said is a preferred exemplary embodiment and that all the possible variations, which may be brought by one skilled in the art, lie within the scope of the invention. The oleopneumatic accumulators, e.g., instead of being located on the tong apparatus for obtaining a self-contained tong apparatus, may be located on the deck of a pontoon or vessel and the oleopneumatic energy necessary to operate the jaws may be conveyed into the oleopneumatic cylinders through underwater pipes.

What we claim is:

1. Tong apparatus operated oleopneumatically for lifting a submerged pipeline, comprising a central body having a curvilinear shape adapted to the outer diameter of the pipeline to be lifted, at least one pair of jaws for grasping and lifting the submerged pipeline which is connected to the side ends of said body and normally maintained in an open position while the tong apparatus is lowered about the submerged pipeline, a double acting cylinder for controlling said jaws which includes two pistons, said cylinder having a body pivotally connected to the upper end of one of said jaws with an active chamber wherein the first piston with a wide cross-section slides, while the second piston has a small-cross section and is pivotally connected to the upper end of the other of said jaws and slides coaxially with respect to the first said piston in a second active chamber in the wide cross-section of the first said piston, oleopneumatic means operatively connected to said active chambers for providing oil thereto for causing said pistons to move said normally open jaws to first close and approach the pipeline and then to grasp the pipeline for lifting thereof by the use of small quantities of oil, and control means connected to said oleopneumatic means which controls the flow of oil from said oleopneumatic means first to said second active chamber where the oil acts against the piston having a small cross-section to effect the relatively wide shifting required for the jaws to approach the pipeline with the use of small quantities of oil, and then to said first active chamber where the oil acts against the piston having a wide cross-section to effect the relatively small shifting required to have the jaws grasp the pipeline for the lifting thereof, also with the use of small quantities of oil.

2. The tong apparatus of claim 1, wherein the jaws are maintained in a normally opened position by an oleopneumatic accumulator connected to the apparatus and to two chambers in the cylinder which oppose said active chambers and to which said accumulator provides oil for a reverse thrust which maintains the jaws in an open position in the absence of oil in said active chambers for closing and grasping said jaws.

3. The tong apparatus of claim 1, wherein there are two pairs of jaws, each pair of which is connected to a double acting cylinder with said two pistons for first closing each pair of normally open jaws, and then for grasping and lifting the pipeline.

4. The tong apparatus of claim 3, wherein the oleopneumatic means for each pair of jaws includes an oleopneumatic accumulator fixed on said central body and connected to said two active chambers of the double acting cylinder to pistons through a three way valve directly operable by a person under water.

5. The tong apparatus 3, wherein claim 3,wherein each pair of jaws includes a water tight reservoir which is connected to the active chambers of said double acting cylinders and pistons for draining the oil therefrom when the jaws are moved to their open position.

6. The tong apparatus of claim 3, wherein means are centrally connected to said apparatus for lowering and raising said apparatus into and from the water.

* * * * *